United States Patent
Schiller et al.

(10) Patent No.: US 7,512,134 B2
(45) Date of Patent: Mar. 31, 2009

(54) SYSTEM AND METHOD FOR TRANSMITTING DATA PACKETS IN AN INFINIBAND NETWORK

(75) Inventors: Claudiu Schiller, Haifa (IL); Leah Shalev, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 10/904,979

(22) Filed: Dec. 8, 2004

(65) Prior Publication Data

US 2005/0141518 A1 Jun. 30, 2005

(30) Foreign Application Priority Data

Dec. 30, 2003 (EP) .................................. 03368128

(51) Int. Cl.
*H04L 12/56* (2006.01)
(52) U.S. Cl. .................... 370/395.31; 370/395.71; 370/419; 709/212; 710/105
(58) Field of Classification Search ............ 370/395.1, 370/419, 389, 395.2, 357, 397, 235; 709/238; 710/100; 326/40
See application file for complete search history.

(56) References Cited

U.S. PATENT DOCUMENTS

| 6,697,359 | B1 * | 2/2004 | George ........................ 370/357 |
| 7,197,662 | B2 * | 3/2007 | Bullen et al. .................... 714/6 |
| 2003/0112805 | A1 * | 6/2003 | Stanton .................... 370/395.1 |
| 2004/0013088 | A1 * | 1/2004 | Gregg ........................ 370/235 |
| 2004/0024903 | A1 * | 2/2004 | Costatino et al. ............ 709/238 |
| 2004/0062242 | A1 * | 4/2004 | Wadia et al. ................ 370/390 |
| 2004/0210693 | A1 * | 10/2004 | Zeitler et al. ................ 710/100 |
| 2004/0252685 | A1 * | 12/2004 | Kagan et al. ................ 370/389 |
| 2006/0006905 | A1 * | 1/2006 | Chou et al. .................... 326/40 |

* cited by examiner

*Primary Examiner*—Hassan Kizou
*Assistant Examiner*—Jeffrey M Rutkowski
(74) *Attorney, Agent, or Firm*—Michael LeStrange

(57) ABSTRACT

The disclosed invention relates to a method and system to transmit data packets through a switched network system that is composed of a plurality of routing entities. The method determines whether or not the output port assigned to the data packet and the associated input port are local to the routing entity by referencing an index pointer to a routing table.

14 Claims, 3 Drawing Sheets

SYSTEM AND METHOD FOR TRANSMITTING DATA PACKETS IN AN INFINIBAND NETWORK

FIELD OF THE INVENTION

The present invention relates to the transmission of data packets in a networking environment, and relates in particular to a system and method for transmitting data packets in an InfiniBand® network.

BACKGROUND OF THE INVENTION

A central processor unit of a computer may communicate with peripheral devices, such as network adapters through an Input/Output (I/O) network. One type of I/O network is known and referred to as the InfiniBand® network. InfiniBand® which is a trademark of the InfiniBand® Trade Association is industry architecture for I/O communications. InfiniBand® architecture enables servers, remote storage and other networking devices, also called endnodes, to communicate concurrently through InfiniBand® architecture fabrics or subnets made of switches and routers that convey data packets to their destination, either within single or multiple subnets. A Subnet Manager Agent (SMA) of the InfiniBand® switch allows data packets received from one source endnode to be passed to a destination endnode within the same subnet. The Subnet Manager Agent configures the switches at the initialization of the network by sending commands to the Subnet Manager Agent. The configuration process includes implementing a routing table within each switch, referenced as the Forwarding Table or Forwarding Database (FDB).

Each destination endnode contains one or more channel adapters having one or more output ports. A unique address is assigned to each output port, known as the port's Local Identifier (LID). The LID address is related to the source endnode using a route field header of a data packet, namely the Local Route Header (LRH), to define its destination address. Each data packet has a unique Destination Local Identifier (DLID) assigned by the (SM) and corresponding to a 16-bit address of a switch output port through which the data packet is conveyed. A Forwarding Table located in a switch maps the DLIDs to the output ports. The Forwarding Database is arranged as a list of port blocks, each port block containing a list of destination output ports.

A complete description of the FDB and all previously defined elements of an InfiniBand® network may be found in the Infiniband® Architecture Specification Volume 1, Release 1.0.a, which is incorporated herein by reference.

To support high capacity switching, a switch may be implemented with several interconnected chips. A data packet arriving at an external input-port of such a switch may be routed internally through several levels of chips before arriving at its destination external output-port. These chips can either be separate switches from the point of view of the Subnet Manager, each with separate Subnet Manager Agent, or a combined switch with only one Subnet Manager Agent, greatly simplifying the management of such a switching fabric.

A multi-chip switch architecture implementation requires the maintenance of the complete routing path of each data packet regardless of the internal routing paths inside one or more switches.

Moreover, all the different constraints of priority, load balancing or Quality of Services (QoS) must be guaranteed as defined by the subnet manager.

The present invention offers a system and method to achieve these requirements.

SUMMARY OF THE INVENTION

Accordingly, the main object of the invention is to provide a switch fabric decomposed in a plurality of sub-switches or routing entities, which appears as a single Infiniband® compliant switch entity.

In a preferred embodiment, the method is implemented for a switching system with at least a SL-to-VL mapping table and includes a plurality of input ports coupled to a plurality of output ports by multiple routing entities. The method enables transmission of a data packet received at a first routing entity to an output port by:

a) assigning an output port to the data packet from a switch routing table associated with the switching system;
b) proceeding to step d if the output port is coupled to the first routing entity, or proceeding to step c if the output port is not coupled to the first routing entity;
c) assigning a local output port to the data packet from a local routing table associated with the first routing entity if the output port previously obtained is not coupled to the first routing entity;
d) proceeding to step f if the input port is coupled to the first routing entity or proceeding to step e if the input port is not coupled to the first routing entry;
e) associating a VL with the data packet from the SL-to-VL mapping table; and
f) placing the data packet in a VL queue.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
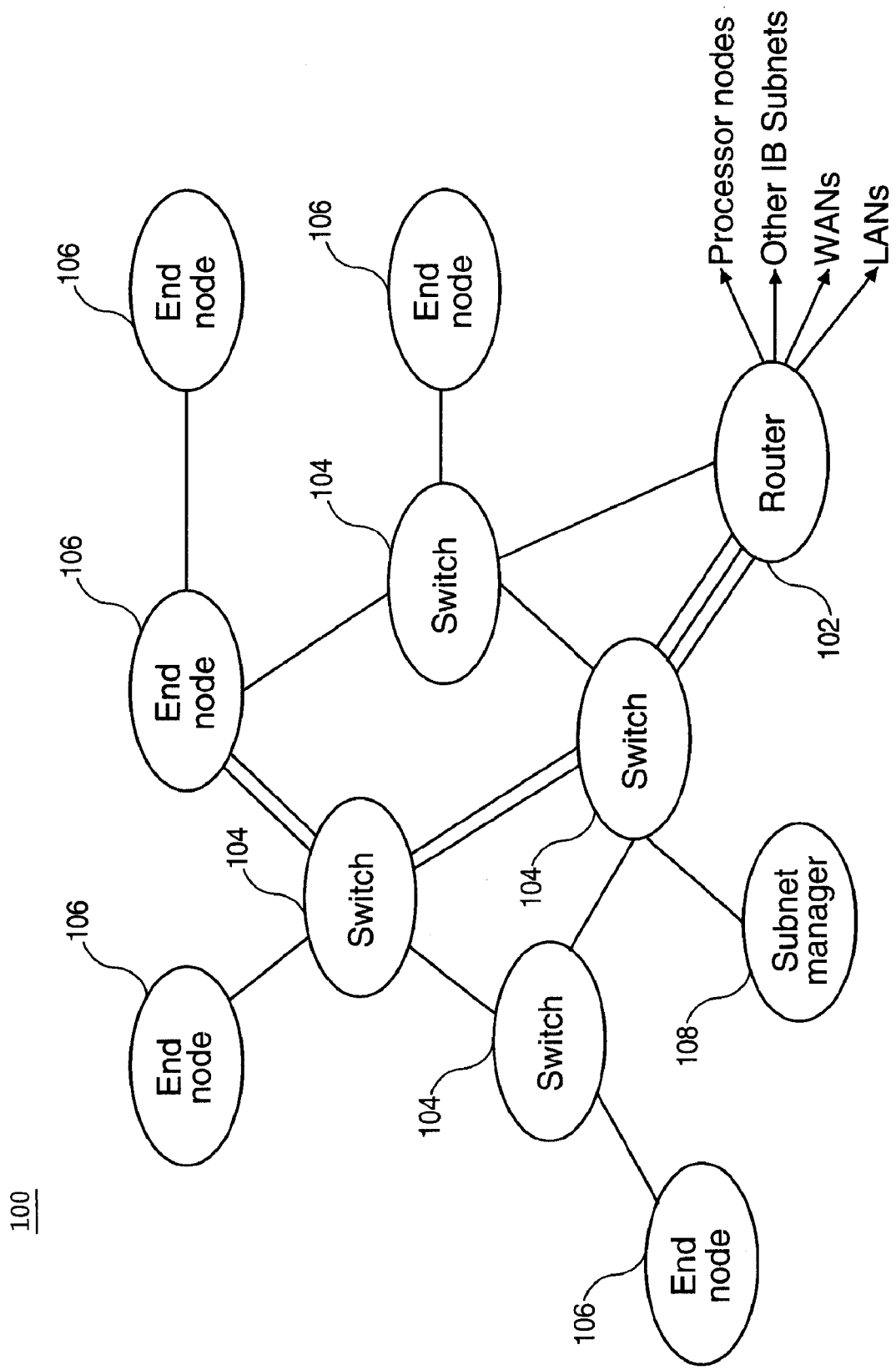
FIG. 1 is a schematic block diagram of a networking environment in which the invention preferably applies.

The invention is preferably implemented in a networking environment as illustrated on FIG. 1 which shows at a high level an example of an InfiniBand® architecture subnet 100. For sake of simplicity, one InfiniBand® architecture subnet is shown but it is to be appreciated that an InfiniBand® network may include several InfiniBand® architecture subnets interconnected by routers 102. Router 102 may also be a bridge between an InfiniBand® architecture subnet and other types of networks such as WANs or LANs. InfiniBand® architecture subnet 100 comprises a plurality of switches 104 to allow a plurality of endnodes 106 to communicate through data packets transmission links.

A Subnet Manager 108 (SM) controls the configuration of the subnet in terms of initialization and maintenance of the routing tables included within the switches. The Subnet Manager is also responsible for initialization and configuration of the SL-to-VL mapping tables (SL2VL), which contain the correspondence between the Service Level (SL) of an incoming packet to its output Virtual Lane (VL). The SL value is placed in the Local Route Header of each data packet and defines the operational Service Level for each data packet.

The VL creates multiple virtual links within a single physical link. Virtual Lanes are configured by the Subnet Manager and are based on the Service Level value of a data packet. As a data packet traverses the switch fabric, its associated SL determines which VL is selected on each link by pointing to a SL-to-VL mapping table configured by the Subnet Manager in the switch.

Once again, a complete description of SL and VL and all previously defined elements of an InfiniBand® network may be found in the Infiniband® Architecture Specification Volume 1, Release 1.0.a referenced above.

Figure 2:
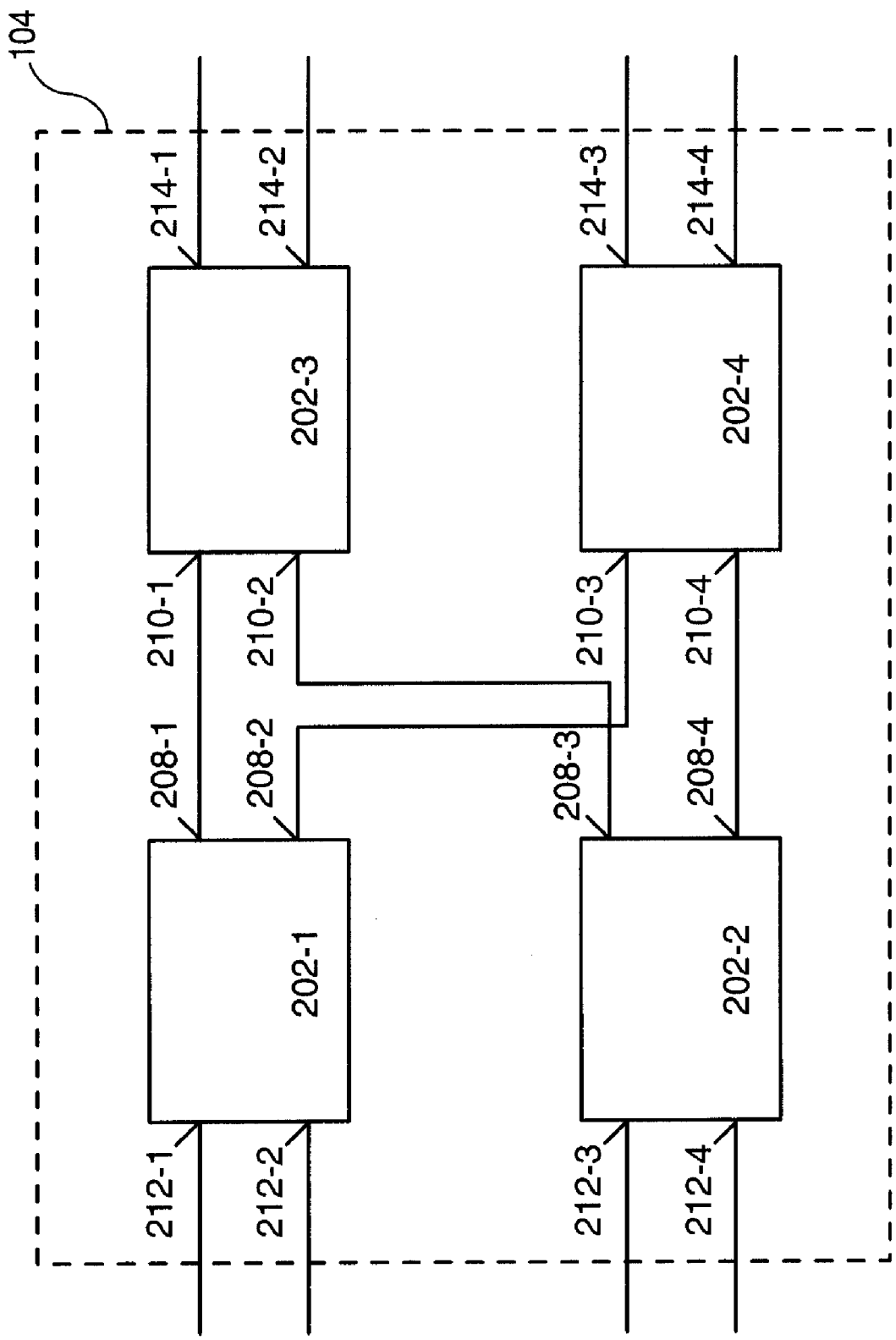
FIG. 2 is a schematic block diagram of a 8-port switch built out of four interconnected 4-port switches.

Referring to FIG. 2, a switching system 104 as used in a preferred embodiment of the invention is detailed. FIG. 2 shows an 8-port global switch implemented with four interconnected 4-port switches (202-1,202-2,202-3,202-4). It is understood that the present example is intended for ease of description while the invention is operable with any configuration of combined chips, such as, for example, a 32-port switch implemented with twelve 8-port switches or a 64-port switch implemented with twenty-four or thirty-two switches depending on the amount of redundant paths required for load balancing. The naming convention of input-port and output-port used in the description is adopted for clarity purposes and is not to be considered as a limitation since a single port may be both an input-port and an output-port.

As shown in FIG. 2, the 8-port global switch has four external input-ports or switch input-ports 212-1 to 212-4 coupled to two 4-port switches 202-1,202-2 and four external output-ports or switch output-ports 214-1 to 214-4 coupled to two 4-port switches 202-3,202-4. In the exemplified two-stage configuration, switches 202-1 to 202-4 each have two internal ports or switch ports 208-1 to 208-4 and 210-1 to 210-4. The internal ports (208-1,208-2,208-3,208-4) are coupled respectively to internal ports 210-1,210-3,210-2 and 210-4.

A configuration register that is managed by the Subnet Manager Agent classifies each port as external or internal. For each switch port there is also a mapping rule corresponding to one of the switch output-ports.

When an incoming data packet arrives at an external input-port 212-i(1-4) of the switch, it has to be routed to the assigned external output-port 214-i(1-4) as defined by its corresponding Destination Local Identifier (DLID). The internal routing path is determined by the algorithm now described with reference to FIG. 3.

Figure 3:
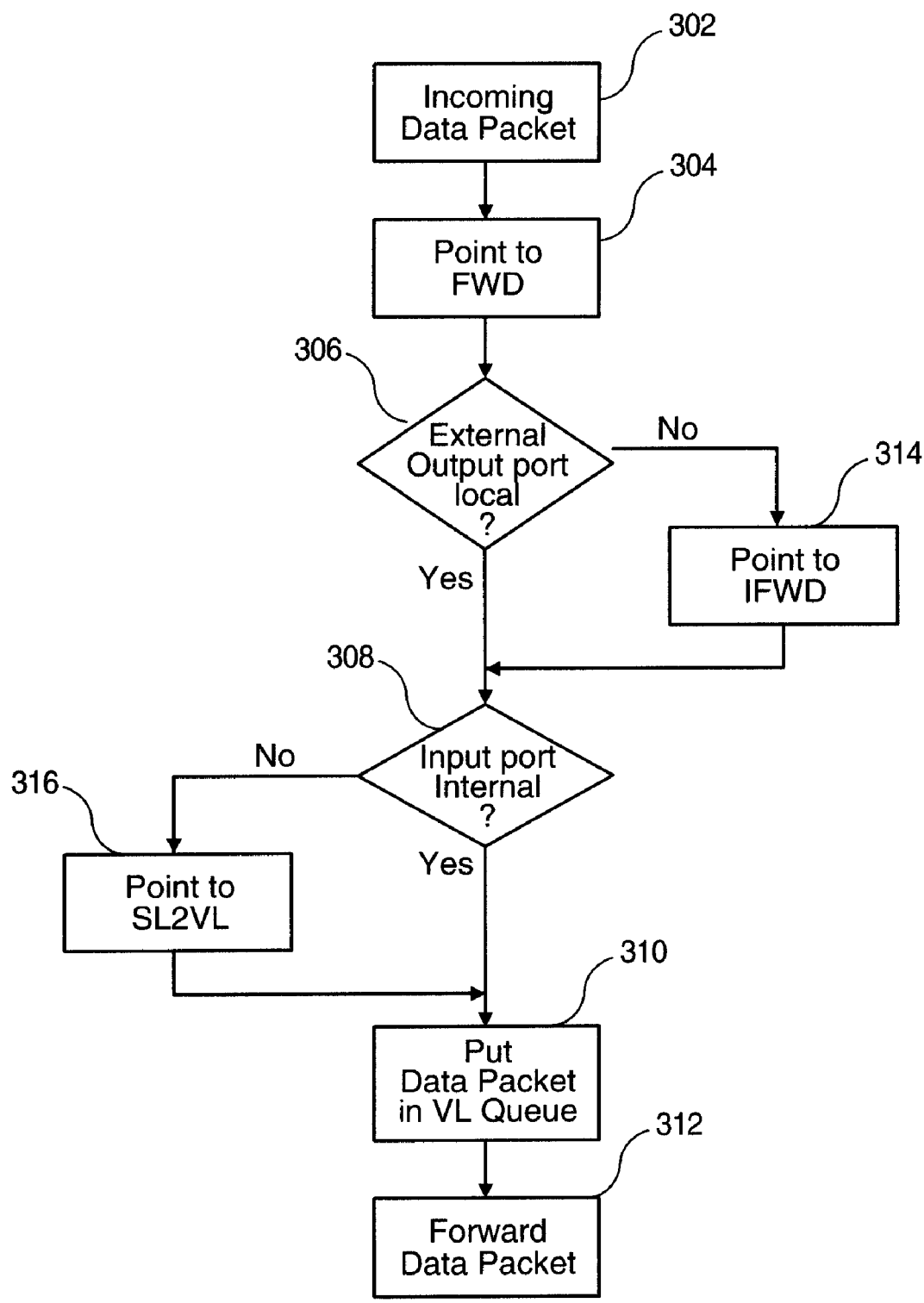
FIG. 3 is a flow chart of the steps for routing unicast data packets according to an embodiment of the invention.

FIG. 3 shows a flow chart detailing the steps for routing data packets within a switch. At step 302, a data packet arriving on an external link of the switch is received at an external input-port 212-i(1-4). The DLID of the incoming data packet is extracted from the data packet header and used at step 304 to obtain an external output-port number 214-i(1-4) assigned to this data packet. The output-port number is obtained by using the extracted DLID as an index to point to a mapping table (Forwarding Table FWD) that is associated with the switch 104.

Step 306 checks whether the external output-port number obtained from the Forwarding Table is local to the chip the data packet is passing through. If the external output-port is local to the chip (branch YES), then step 308 checks the input port to determine whether it is an internal port or an external port.

If the input-port is an internal port (branch YES), then step 310 sets output VL equal to the packet VL and the data packet is placed in a corresponding VL queue for step 310. The process ends on step 312 by forwarding the data packet out of the switch.

If the input-port is an external port (branch NO), then the process continues to step 316.

Step 316 performs a SL to VL mapping. The incoming SL, the input-port number and the external output-port derived in previous steps are used to address a SL2VL table to obtain the VL that is going to be sent with the data packet. The process then continues with steps 310 and 312 as previously described.

Going back to step 306, If the external output-port number obtained from the Forwarding Table is not local to the chip (branch NO) then the process continues to step 314.

Step 314 uses the external output-port number obtained on the previous step as an index to point to a second mapping table (Internal Forwarding Table IFWD) associated with the current chip to assign a local output-port number to the data packet.

In alternate embodiments where load balancing is required, one or several 'lsb' bits of the DLID may be combined with the external output-port number for indexing the IFWD table.

Then, the process continues with step 308 as previously described.

It is to be appreciated that the description has been made for unicast network traffic of data packets but may be applied with minor adaptations to multicast network communications. In particular, the external input-port is encoded with a number of bits based on the number of multicast addresses used in the subnet, the number of ports in the switch and other implementation tradeoffs.

While the invention has been described in detail, the foregoing description is in all aspects illustrative and not restrictive. It is understood that numerous other modifications and variations can be devised without departing from the scope of the invention.

What is claimed is:

1. A method for transmitting a data packet received at a first routing entity in a switched network system having at least a Service Level to Virtual Lane (SL-to-VL) mapping table and comprising a plurality of input ports coupled to a plurality of output ports by multiple routing entities, the method comprising:
    a) assigning an output port to the data packet from a switch routing table associated with the switched network system;
    b) determining whether an output port is coupled to the first routing entity;
    c) assigning a local output port to the data packet from a local routing table associated with a first routing entity if the output port previously obtained is not coupled to the first routing entity;
    d) determining whether an input port is coupled to the first routing entity;
    e) associating a Virtual Lane (VL) to the data packet from the SL-to-VL mapping table if the input port is not coupled to the first routing entity; and
    f) placing the data packet in a VL queue buffer.

2. The method according to claim 1, wherein the step assigning a data packet to a local output port using a switch routing table further comprises using a Destination Local Identifier (DLID) of the data packet to point to an index in the switch routing table.

3. The method according to claim 1, wherein the step of assigning a local output port to the data packet from a local routing table associated with the first routing entity further comprises using the output port obtained in the step assigning an output port to the data packet from a switch routing table associated with the switched network system.

4. The method according to claim 1 wherein the step of assigning a local output port to the data packet from a local routing table associated with the first routing entity further comprises using the output port obtained in the step assigning an output port to the data packet from a switch routing table associated with the switched network system combined with the DLID to point to the local routing table.

5. The method according to claim 1 further comprising the step of forwarding the data packet out
of the switched network system to a final destination address.

6. The method according to claim 1 wherein the data packet is a unicast data packet.

7. The method of according to claim 1 wherein the data packet is a multicast data packet.

8. The method according to claim 1 wherein the switched network system comprises a switch node of a scalable switched fabric communication link with point-to-point bi-directional serial interconnect and associated protocol.

9. The method of claim 8 wherein the scalable switched fabric communication link with point-to-point bi-directional serial interconnect and associated protocol comprises one or more switched network systems.

10. The method according to claim 1, further comprising a switching controller having a system management capability to execute the transfer of data packets in the switched network system.

11. The method according to claim 1, wherein the first routing entity comprises a switch.

12. The method according to claim 1, wherein the multiple routing entities comprise a plurality of interconnected multi-port switches.

13. A computer readable medium, tangibly embodying an executable program of instructions causing a computer to perform method steps for transmitting a data packet in a switched network system, the method steps comprising:
   a) assigning an output port to the data packet from a switch routing table associated with the switched network system;
   b) determining whether an output port is coupled to the first routing entity;
   c) assigning a local output port to the data packet from a local routing table associated with the first routing entity if the output port previously obtained is not coupled to the first routing entity;
   d) determining whether an input port is coupled to the first routing entity;
   e) associating a VL to the data packet from the SL-to-VL mapping table if the input port is not coupled to the first routing entity; and
   f) placing the data packet in a VL queue buffer.

14. A method of routing data packets through a high speed communications switch fabric, comprising:
   receiving a first data packet from an external link of the switch fabric at a first input port;
   extracting a destination local identifier (DLID) from a header field within the first data packet;
   obtaining a first output port identifier using the extracted DLID as an index to point to a first mapping table associated with the switch fabric; and
   determining whether the first output port identifier corresponds to a local output port of the switch fabric,
      wherein if the first output port is local to the switch fabric:
         determining whether the first output port identifier is mapped to an internal port or external port of the switch fabric,
         assigning a SL to VL mapping based on a service level (SL) associated with the first data packet, a first input port identifier and the first output port identifier, and
         forwarding the first data packet with the SL to VL mapping out of the switch fabric, or
      wherein if the first output port identifier obtained from the first mapping table is external to the switch fabric:
         assigning a second output port identifier to the first data packet by indexing the first output port identifier to a second mapping table associated with the switch fabric.

* * * * *